Inventors
Herman C. Graebe
Clyde C. Wilson

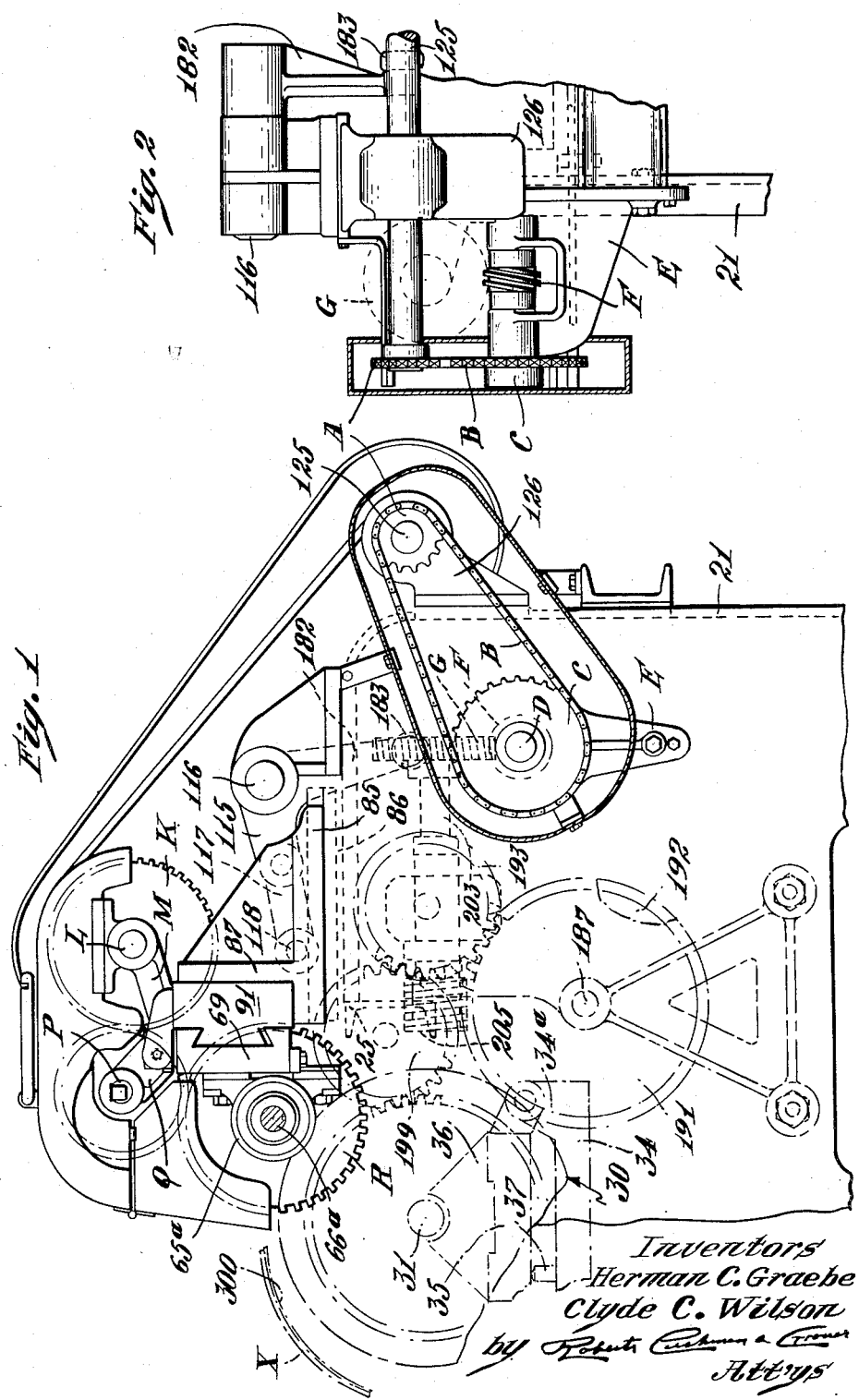

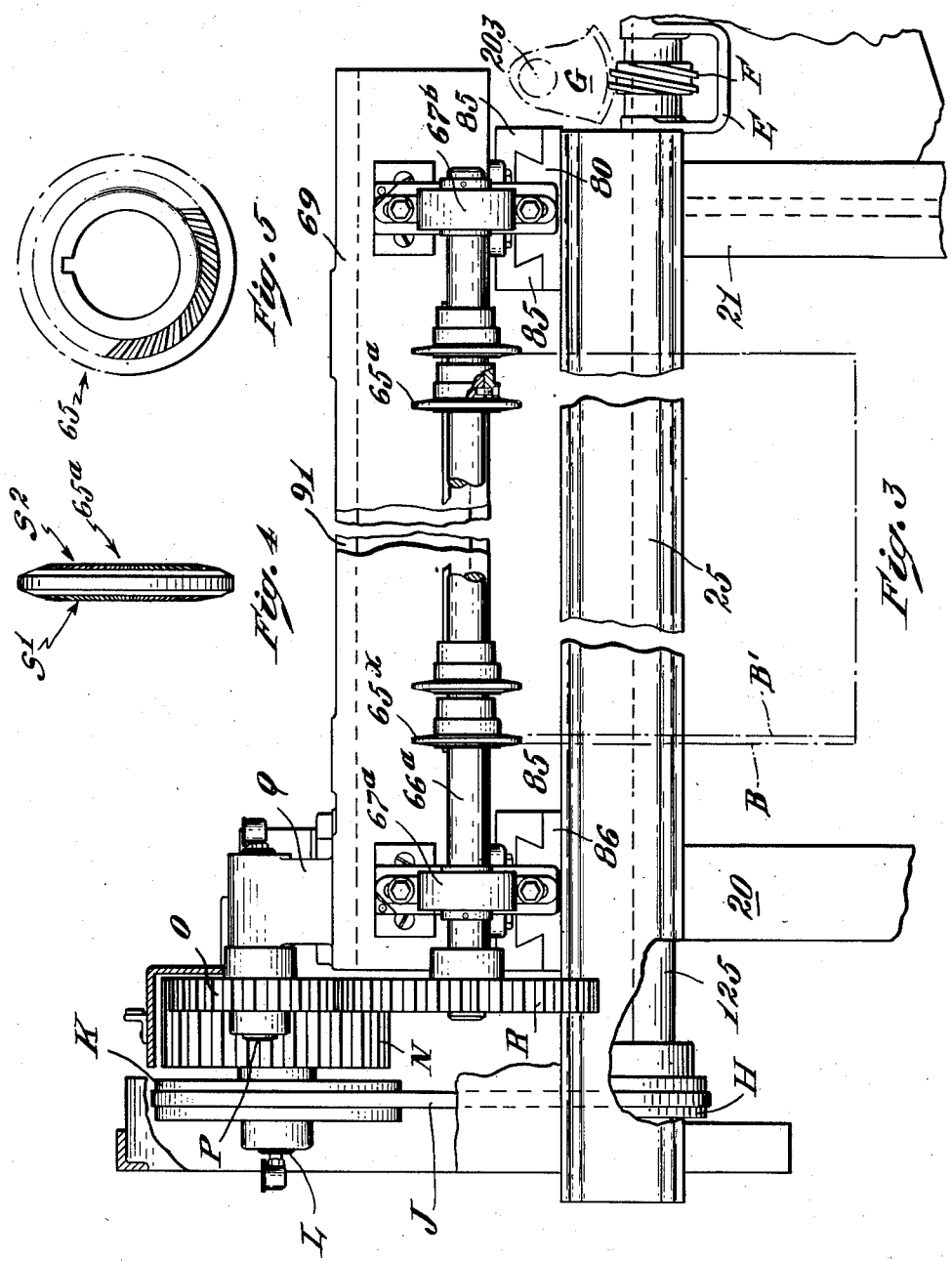

Inventors
Herman C. Graebe
Clyde C. Wilson

Inventors
Herman C. Graebe
Clyde C. Wilson

Aug. 21, 1956    H. C. GRAEBE ET AL    2,759,377
MACHINE FOR AND METHOD OF SIDE-FILING
GIN AND SIMILAR SAWS
Filed Jan. 7, 1955    6 Sheets-Sheet 6

Inventors
Herman C. Graebe
Clyde C. Wilson
by Roberts Cushman & Croner
Attys

United States Patent Office 2,759,377
Patented Aug. 21, 1956

2,759,377

MACHINE FOR AND METHOD OF SIDE-FILING GIN AND SIMILAR SAWS

Herman C. Graebe, Bridgewater, and Clyde C. Wilson, East Bridgewater, Mass., assignors to The Murray Company of Texas, Inc., Dallas, Tex., a corporation of Delaware Application January 7, 1955, Serial No. 480,428

13 Claims. (Cl. 76—48)

This invention pertains to machines for filing saws, and relates more especially to mechanism useful in the filing of gin or linter saws.

In cotton gins and linters the fiber is separated from the seeds by the use of circular saws, a large number of which are arranged in closely adjacent relation upon a single shaft or arbor. The teeth of these saws must be kept sharp for efficient operation, and as it is inexpedient to remove them from their supporting shaft after once securing them in position thereon, it is necessary to sharpen them without separating them one from the other.

While, in the production of second cut lint, it is possible to use saws whose teeth are shaped and sharpened by the use of a saw gumming machine alone, it is necessary when making first cut lint (which the trade demands be as clean and smooth as possible) to side-file the saw teeth in order to remove burrs and thus insure quality lint.

Since, as above noted, the saw shaft or arbor supports a large number of saws and as each saw has many teeth, the side filing of the teeth of a saw cylinder in an expeditious manner is a problem of considerable difficulty. While this operation may be and in many cases is performed by hand, the time consumed is so great as to necessitate the keeping on hand of a large stock of extra saw cylinders in order to permit of the continuous operation of the gin or linter. Various machines have heretofore been devised for use in the filing of such saws, for example, machines in which reciprocating files, similar to the ordinary hand operated file, are machine operated. To obtain the desired shape of tooth it is necessary to arrange the file at an angle to the plane of the saw blade, and this involves an element of difficulty when using a reciprocating file because of the close spacing of adjacent saws. It also makes necessary the shifting of the file to the opposite angle, after filing the teeth on one side, preparatory to filing the other side of the tooth. Thus, in many cases, prior machines designed for the automatic filing of saw cylinders, if at all practical, are but little faster than a skilled workman filing the saws by hand, and usually such machines require constant or frequent attention of an attendant, so that little is actually gained by the use of such machines.

The principal object of the present invention is to provide a novel method of and mechanical means for filing gin or linter saws in a highly expeditious manner and with a minimum degree of attention from an operator or attendant. To this end it is proposed to mount the saw shaft or arbor in suitable supports and to turn the shaft continuously through a full revolution whereby to bring each saw tooth in succession of the blade or blades being operated upon into the field of action of the filing means.

A further object is to provide for the automatic cessation of the filing operation at the completion of each successive revolution of the saw cylinder; the automatic shifting of each filing device to a position where it may engage a fresh saw of the series; the automatic resumption of the filing operation after the filing devices have been so shifted; and the automatic stopping of the entire machine when all of the saws have been filed, thus making it unnecessary for an attendant to watch the machine after once starting it.

As the saws are very closely adjacent to one another upon their shaft, it is inadvisable, from a practical standpoint, to attempt to file all of the saws simultaneously, due to the difficulty of holding and actuating files in such close proximity one to the other as would be necessary for such operation. However, to reduce the time of filing as much as possible, the present invention provides for applying a filing device simultaneously to the opposite faces of the saw blades constituting recurrent pairs of the series, for example to each third or fourth or fifth pair according to the number of saws in the cylinder, and in the attainment of this object disk type files are employed, these files being arranged to turn about an axis parallel to that of the saw cylinder. A further object of the invention is to provide automatic means for shifting the files longitudinally of the saw cylinder, after each complete rotation of the latter, so that if, for example, a given file was positioned between the saws of the first pair of the series during a given rotation of the saw cylinder, it will next be positioned between the saws of the second pair of the series, and so on.

A further object is to provide for advancing all of the files simultaneously from a rear or neutral position into operative engagement with the saws preparatory to the starting of the saw cylinder into rotation and for returning them to the rear or neutral position when the saw cylinder has completed a revolution, and then, while the files are in such rear or neutral position, for moving the entire set of files lengthwise of the saw cylinder while they are clear of the saws preparatory to advancing them again to the operating position.

It is contemplated that appropriate means will be provided for supporting the saw cylinder in operative position and for adjusting it relatively to the files, and that suitable means may be provided for supporting the saws during the filing operation thereby to minimize vibrations.

Other and further objects and advantages of the invention will be pointed out in the following more detailed description and by reference to the accompanying drawings, wherein:

Fig. 1 is a more or less diagrammatic right-hand end elevation showing so much of a filing machine embodying the present invention as is requisite for an understanding of its essential parts;

Fig. 2 is a fragmentary rear elevation of parts shown in Fig. 1;

Fig. 3 is a fragmentary front elevation omitting parts, but showing the file shaft and the means for driving it;

Fig. 4 is an edge view of one of the files, to larger scale than in Fig. 3;

Fig. 5 is a side view of the file shown in Fig. 4;

Figure 7:
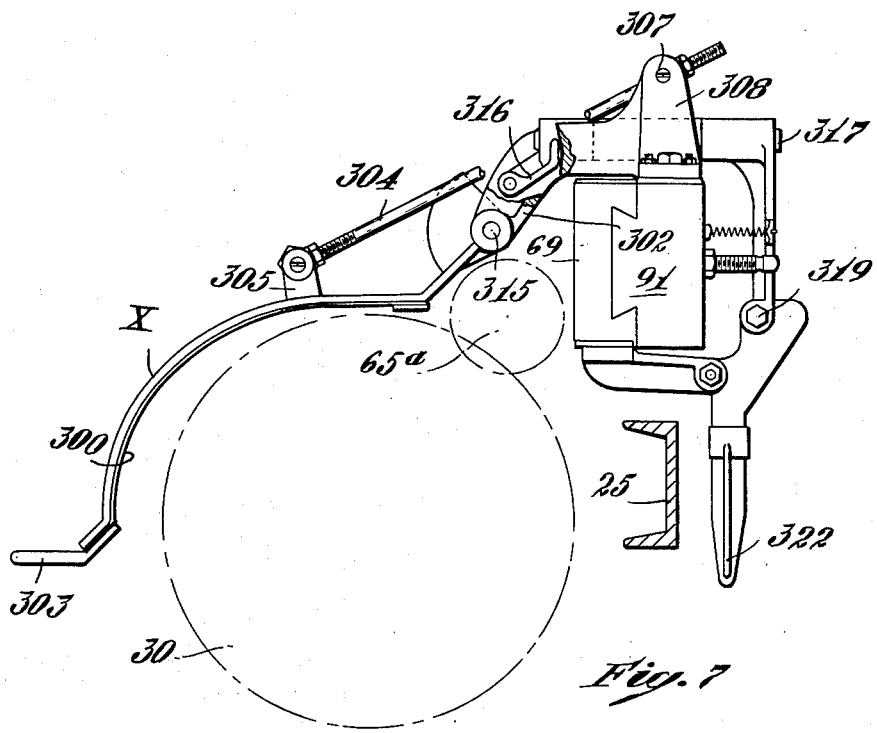
Fig. 7 is a fragmentary right-hand end elevation illustrating a preferred type of guard for the saw cylinder.
Figure 6:
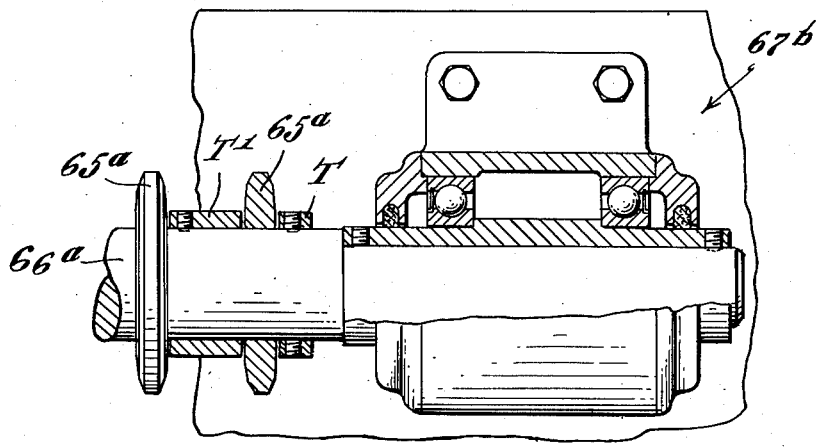
Fig. 6 is a fragmentary rear elevation to larger scale, showing one of the end bearings for the file shaft and the mode of mounting the files on the shaft.

The patent to Inglee 2,292,224, dated August 4, 1942 discloses a commercially practical machine for automatically gumming the teeth of a gin or linter saw. The apparatus of the present invention is in the nature of a modification of that machine thereby to convert it from a gummer to a side-filing machine. Accordingly, the following description makes frequent reference to the Inglee patent for a disclosure of features common to the two devices, and the present drawings are in general limited to structural details not found in the Inglee disclosure, those parts which are common to the two being designated by the same reference numerals as used in the patent specification.

As illustrated, the machine comprises a frame including end members 20 and 21 (Fig. 3) rigidly united by transversely extending channel bars, one of which is indicated at 23 (Fig. 1). The numeral 30 (Fig. 1) designates a conventional saw cylinder comprising an arbor 31 upon which is mounted a series of parallel, circular saw blades uniformly spaced apart and splined to the arbor. The arbor 31 turns in journal bearings 36 (one only being shown) carried by pillows 35 supported by slide blocks 34 resting on the frame and movable horizontally from front to rear. The inner or rear end of each pillow 35 is pivoted to ears on the corresponding block 34, and its forward or outer end rests on a vertically adjustable stud 37. By appropriate means, more fully described in the above patent to Inglee but not here shown, the studs 37 at opposite ends of the machine may be moved simultaneously up or down thereby to vary the heights of the pillows 35. Likewise appropriate means (illustrated in said patent but not here shown) is provided for moving the blocks 34 and the parts carried thereby from an inner, rear or operative position to a forward position thereby to facilitate the mounting or removal of the saw cylinder.

The side filing of the saw teeth is performed by the use of disk-type files 65ª (Figs. 1, 3, 4, 5 and 6) mounted in axially spaced relation upon a shaft 66ª (Fig. 3) whose axis is parallel to that of the saw cylinder and which is journaled near the opposite ends respectively, of the machine in bearings 67ª and 67ᵇ respectively, carried by a beam 69 (Figs. 1, 3 and 7) provided at its rear face with a longitudinally extending dovetail groove. The beam 69 with the parts carried thereby is supported by carriages 85, Fig. 1 (one only being shown) movable from front to rear, the carriages being supported by the end frame members 20 and 21 and sliding along guides 86. Each carriage includes a vertical flange 87 to which is secured a beam 91 having a dovetail rib which fits in the groove of the beam 69 whereby the beam 69 is supported for horizontal movement from right to left.

The beam 91, which supports the beam 69 on which the bearings for the shaft 66ª carrying the disk files are mounted, is bodily movable from front to rear by means comprising links 117 (Fig. 1) at opposite sides of the machine connected at their front ends at 118 to the corresponding carriage 85 and at their rear ends to lever arms 115 at opposite sides of the machine which are keyed to a rock shaft 116 journaled in bearings carried by the frame.

Figure 9:
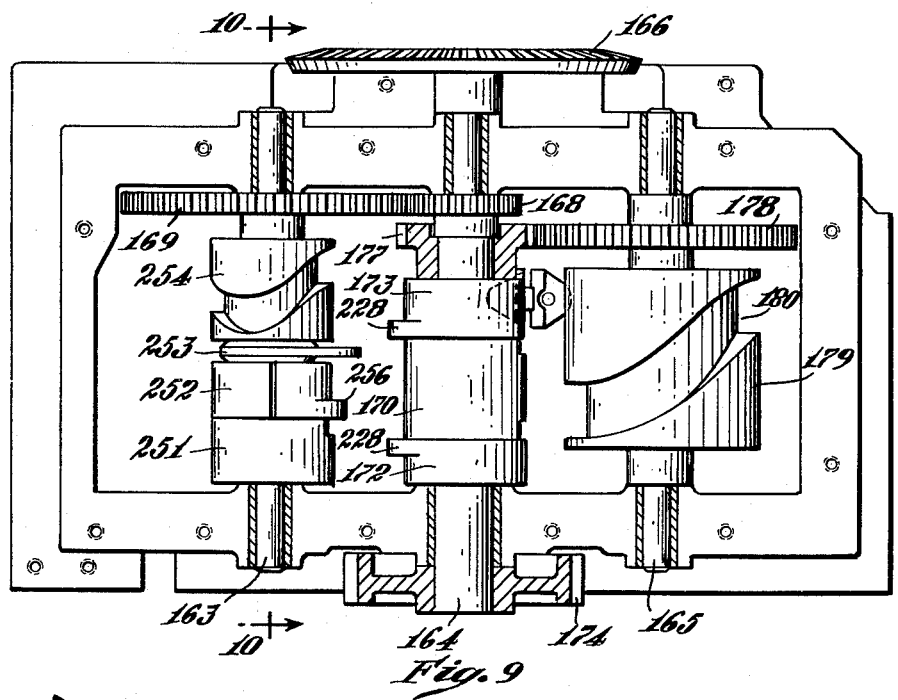
Fig. 9 is a plan view of a gear box containing devices for controlling the operation of the machine.

An arm 182 (Fig. 1), fixed at its upper end to the rock shaft 116, is provided at its lower end with a cam follower roll 183 which engages a cam track 180 (Fig. 9) in a cam 179, hereinafter more fully described.

If desired, the saw blades may be braced during the filing operation by rigid fingers (not here shown) which may be interposed between adjacent saw blades and which bear against the sides of the blades thereby to keep the blades in accurately parallel relation and to reduce vibration while the files are acting. Such bracing fingers are more fully described and illustrated in the above patent to Inglee.

Figure 10:
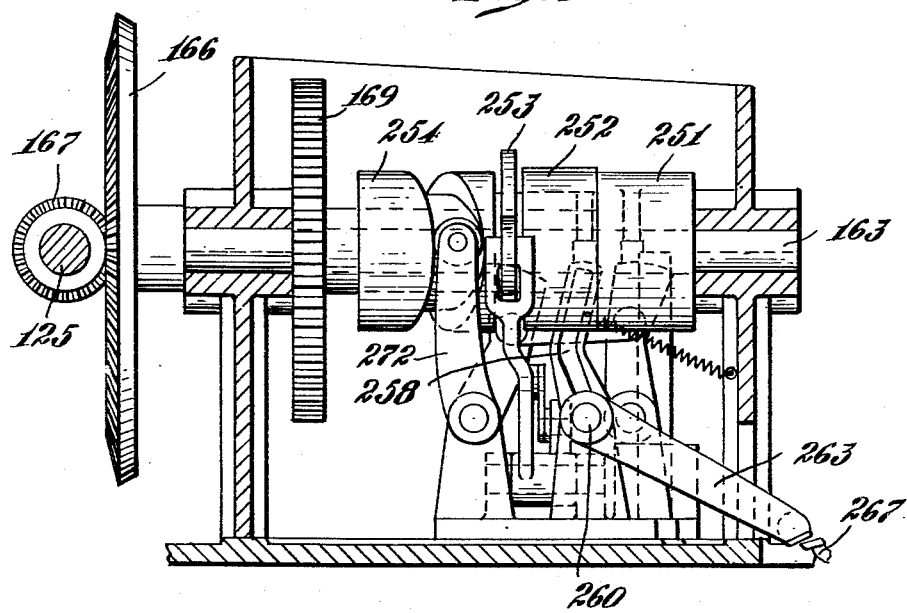
Fig. 10 is a vertical section through the gear box on the line 10—10 of Fig. 9.

The main drive shaft 125 (Figs. 1 and 10) is mounted in brackets 126 (Fig. 1) at the rear of the machine frame. This shaft is driven by any suitable source of power and near one end carries a sprocket wheel A (Figs. 1 and 2).

Figure 11:
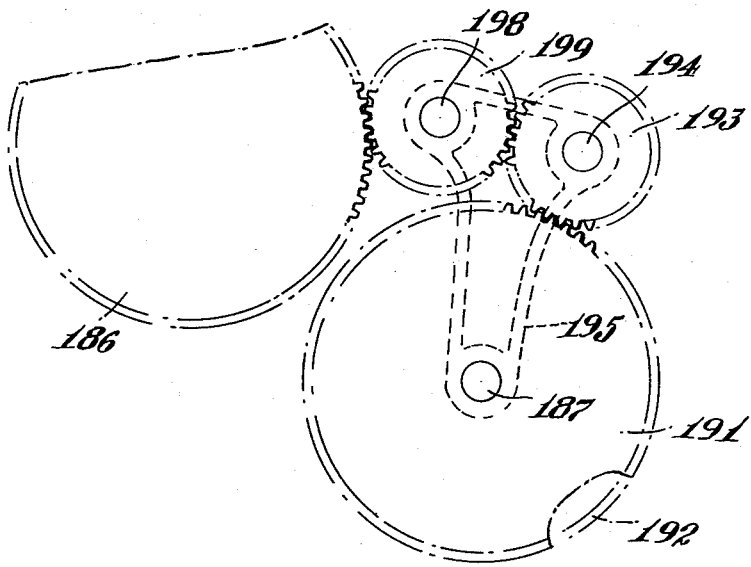
Fig. 11 is a diagrammatic elevation showing a gear train for driving the saw cylinder.

An endless sprocket chain B transmits motion from the sprocket wheel A to a sprocket wheel C on a jack shaft D journaled in bearings in a bracket E fixed to the end frame member 21. A spiral gear F (Fig. 2) keyed to the shaft D drives a complemental gear G (Fig. 1) on a shaft 203 mounted in bearings carried by the machine frame. A worm 205 (Fig. 1) splined to the shaft 203 drives a worm wheel 192 on a horizontal countershaft 187 (Figs. 1 and 11) extending transversely of the machine at its front. A gear 191 fixed to the countershaft 187 meshes with a gear 193 (Fig. 11) on a stub shaft carried by a rock arm 195 pivoted to swing about the shaft 187. The gear 193 meshes with a gear 199 also mounted on a stub shaft carried by the arm 195, while the gear 199 also meshes with a gear 186 on the saw arbor 31. By appropriate connections shown and more fully described in the above patent to Inglee, the arm 195 is caused to rock as the saw arbor 31 is moved from front to rear, thus keeping the series of gears in driving engagement regardless of the position of the saw cylinder.

A wheel H (Fig. 3) on the left-hand end of shaft 125 is embraced by an endless silent-type chain J which passes about a wheel K on a shaft L turning in bearings carried by a bracket M (Fig. 1) fixed to the top of beam 91. A wide-faced gear N (Fig. 3) splined to the shaft L meshes with a gear O (Figs. 1, 3 and 6) turning on a stub carried by a bracket Q fixed to the top of the beam 69 which supports the file shaft 66ª. The gear O also meshes with a gear R on the end of the shaft 66ª on which the files are mounted. By the gear train just described, the file shaft is constantly driven, regardless of the position of the beam 69.

As above suggested, the main shaft 125 may be driven from any source of power, for instance, by means of a belt or directly by an electric motor. For determining the starting and stopping of the main shaft 125, means such as more fully described in the aforesaid Inglee patent may be used, such means including a longitudinally movable bar (not here shown) carrying a belt shipper or switch actuator and provided with manually operable means for moving it to starting position; a latch for holding it in the starting and operating position; and means moving with the longitudinally movable beam 69 for tripping the latch and so stopping the machine at the completion of the filing operation.

While it would be possible to file all of the saws in a given saw cylinder by means of a single file 65ª, such a procedure would take an undue amount of time, and accordingly a series of files is provided as above suggested. However, for practical reasons, in particular the requirement as to fixing the file to the shaft 66ª, it is inexpedient to provide as many files as saw blades, and as here illustrated, the number of files is one-fourth of the number of saw blades.

Each file 65ª, as shown more particularly in Figs. 4 and 5, comprises a disk of file steel provided at opposite sides with smooth bevel faces to facilitate entrance of the file disk between adjacent saw blades. Inwardly of these smooth bevel faces the disk has bevel surfaces S' and S² converging at a steeper angle than the smooth surfaces, these surfaces S' and S² being cut to form file teeth. The bevel faces S' and S² slope at the proper angle to impart to the sides of the saw tooth the desired shape, it being understood that files having different angles may be provided for use on the shaft 66ª in accordance with the desire of the user as to the particular tooth shape most appropriate for the conditions of use. Desirably, the file disks are splined to the shaft and free to slide a very short distance to accommodate themselves to the saw spacing, such movement of the files being limited by collars T, T' (Fig. 6) fixed to the shaft.

For controlling the motion of the file carrying beam 69 from front to rear and from left to right, there is provided a gear box 160 (Figs. 9 and 10), in general similar to that designated by the same reference character in the Inglee patent. This gear box has bearings in opposite side walls (Fig. 9) for three parallel shafts 163, 164 and 165. A bevel gear 166 is fixed to one end of the middle shaft 164. This gear meshes with a bevel pinion 167 (Fig. 10) fixed to the main shaft 125. Thus the shaft 164 is driven continuously so long as the machine is in operation. Within the gear box a double-ended clutch element 170 is fixed to the shaft 164. At one side of the clutch element 170 there is arranged a clutch member 173 which is normally so related to clutch element 170 as to turn with shaft 164, but which may be released from the clutch element 170 so as to become idle. A gear 177 is fixed to the clutch element 173 and meshes with a gear 178 fixed to the shaft 165. The cam 179 (above referred to) is fixed to the shaft 165, this cam having a groove 180 which receives the roll 183 at the lower end of the rock arm 182. Thus the turning of the shaft 165 results in moving the beam 91 which supports the file shaft 66ª from rear to front and return for each complete rotation of the shaft 165.

A second clutch element 172 is arranged at the other side of the double-faced clutch element 170, the clutch element 172 being normally disconnected from the shaft 164 but being actuable, at times, by the clutch element 170 so as to turn with the shaft. A gear 174 is fixed relatively to the clutch element 172, this gear 174 corresponding to the similarly numbered gear shown and described in the Inglee patent, and through connections such as fully described in said patent (but not here shown) moving the beam 69 from right to left.

A gear 169, fixed to the shaft 163 within the gear box, meshes with a gear 169 on the shaft 163 so that the shaft 163 is constantly driven. A clutch element 251 is fixed to the shaft 163 and at times cooperates with a clutch member 252 so as to constrain a disk cam 253 and a cam sleeve 254 (normally loose on the shaft 160) to turn with the shaft.

The clutches, comprising the parts 173 and 252, respectively, are of a well known one-revolution type, more fully described in the Inglee patent. Each of the clutch elements 172 and 173 has a trip 228, while the clutch element 252 has a trip 256. When any one of these trips is moved to a certain position, the corresponding clutch element is released to turn with its respective shaft through a single revolution.

Figure 12:
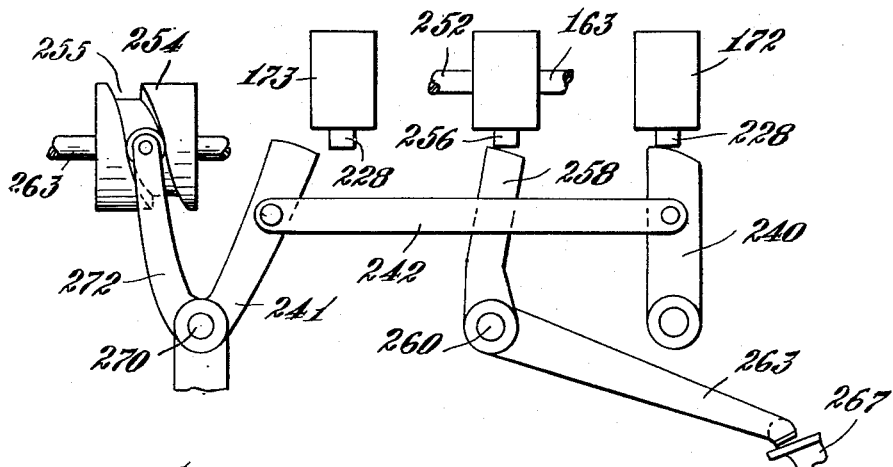
Fig. 12 is a diagram illustrative of the means for actuating the clutch trip devices.

The control for the several clutch trips is more fully shown and described in the above Inglee patent, but is here diagrammatically indicated in Fig. 12. Thus for controlling the trip 256 of clutch 252 there is provided a lever arm 258 fixed to a rock shaft 260, to which a second lever arm 263 is also secured. The free end of the arm 263 is located in the path of an arm 267 fixed to the countershaft 187, which makes one revolution during the filing of each successive saw blade. The parts are so arranged that at the completion of the filing of the teeth of one blade the arm 267 engages the lever 263 and thereby actuates the trip 256 to start the shaft 163 into rotation, thus initiating a new cycle of operation.

The trips 228 of clutches 172 and 173 respectively, are actuated by rock arms 240 and 241 respectively, which are connected by a link 242 so that they must rock at the same time. The arm 241 is fixed to a shaft 270 to which a second arm 272 is fixed, the latter arm having a cam follower roll which is disposed in a cam groove 255 in the cam sleeve 254. Thus when the cam sleeve 254 starts to turn, the arms 241 and 242 are thereby moved so as to actuate the trips 228 in properly timed relation.

In the following description of the operation of the filing of the teeth of a saw cylinder it is assumed that while the machine was at rest the blocks 34 were moved forwardly, the arbor of a saw cylinder was placed in the bearings 36 and the blocks 34 moved rearwardly again to the position shown in Fig. 1, and there locked to hold the saw cylinder in the position for filing. It is also assumed that the beam 91 which carries the file shaft 66ª had been moved to its rear or inoperative position, and that the beam 91 was moved by manual means, such as more fully described in the Inglee patent, so that the endmost file 65$^x$ (Fig. 3) is in register with the space between the inner faces of the two endmost saw blades B' and B$^2$, it being understood that each file of the series is likewise registered with the space between two adjacent saw blades.

The machine being in readiness for operation, the shipper rod, or equivalent device, is now manually actuated thereby starting the main shaft 125 into operation. Through the gear connections above described the saw arbor 31 begins to turn, and the file shaft 66ª is also rotated. Since the clutch member 173 normally turns with the shaft 164, the cam 179 immediately starts to turn and during the first half revolution moves the file supporting beam 91 forwardly to the operative position where each file is entered between the opposed faces of adjacent saw blades. During the continued rotation of the saw cylinder, all of the teeth at one side of a given blade are filed.

Assume now that the saw cylinder has completed one revolution. At the end of this revolution the trip finger 267 carried by the countershaft 187 engages the arm 263 and thereby actuates trip 256 of clutch 252. This allows the cam 254 to make a single revolution. During the single revolution of the cam 254 the clutch 173 makes a single revolution, and stops but because of the gear ratio, this turns the shaft 165 one-half revolution, and the cam 179 acts during this time to retract the files from operative position. During the same revolution of the cam 254, the clutch 172 is released by the corresponding trip 228 and turns one revolution and then stops. This moves the files endwise a distance equal to the space between adjacent saw blades in accordance with the gearing, shown in the Inglee patent, provided for that purpose. During the same rotation of the cam 254 the clutch 173 is released by the corresponding trip 228 and turns another full revolution. This turns the shaft 165 one-half revolution, whereby the files are restored to operative position, and the files again engage the blades. At the end of the revolution of the saw cylinder the finger 267 again trips the member 252 and the cycle is repeated. Since both saws and files are turning during the filing operation, the filing overlaps several teeth at the end of each rotation of the saw cylinder, but this is of no material consequence.

Figure 8:
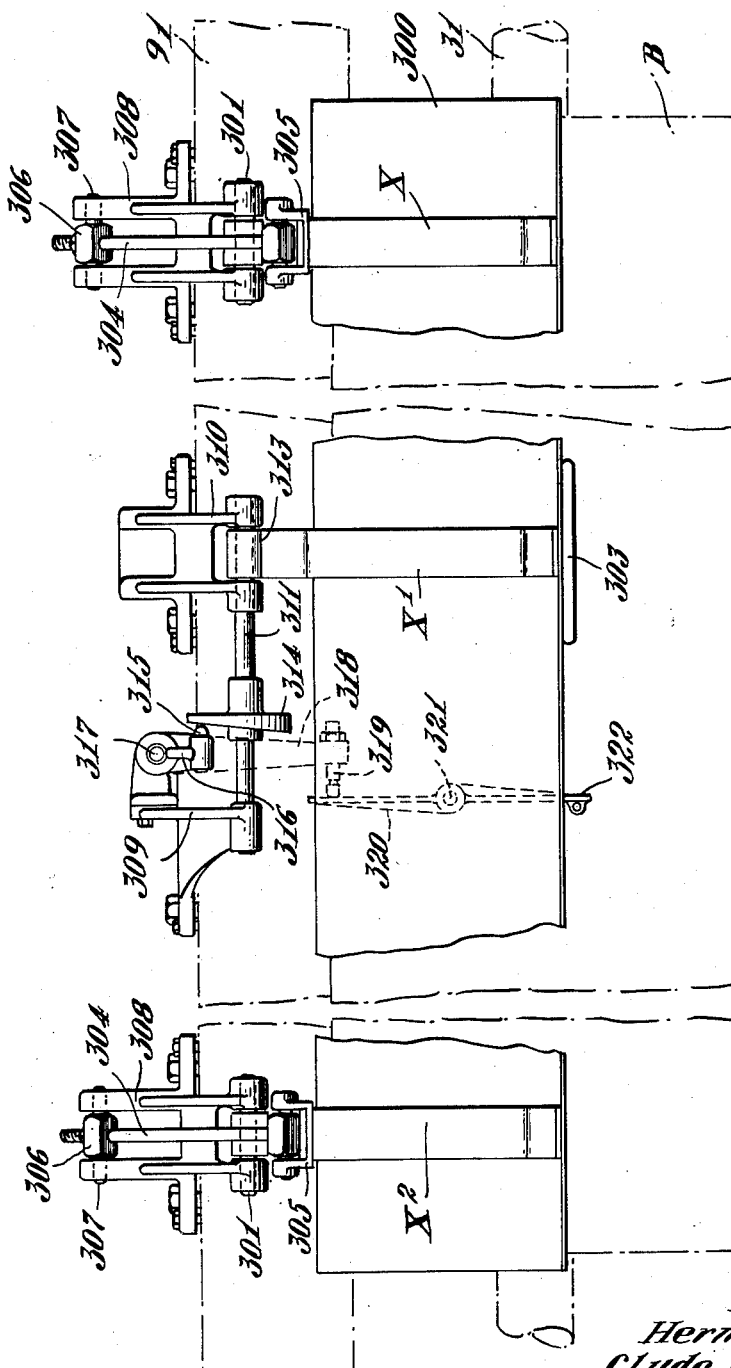
Fig. 8 is a front elevation of the parts shown in Fig. 7.

Since the saw cylinder rotates at substantial peripheral speed while turning clockwise, as viewed in Figs. 1 and 8, there is some danger that the clothing of an operator standing in front of the machine may be caught in the saw teeth, with resultant injury. Accordingly, the machane of the present invention is desirably equipped with a guard which encases the front upper quadrant of the saw cylinder while the machine is in operation.

As illustrated in Figs. 7 and 8, this guard comprises a shell 300 of sheet metal or equivalent material having stiffening ribs X, X$^1$ and X$^2$, for instance of channel bar stock, suitably spaced apart longitudinally of the shell. The two endmost stiffening ribs X and X$^2$ (Fig. 8) are hinged at their upper ends at 301 (Fig. 8) to brackets 302 (Fig. 7) respectively, mounted on the beam 91. The shell 300 is curved more or less cylindrically as shown in Fig. 7, to conform in general to the curvature of the saw cylinder but with ample clearance between them. The central stiffening rib X$^1$ (Fig. 8) is provided at its lower end with a handle member 303 to facilitate swinging the shell upwardly about its hinges at 301.

For supporting the shell in operative position, tension rods 304 are pivotally attached to brackets 303 secured to the endmost stiffening ribs of the shell, the upper ends of these tension rods passing through sleeves 306, turning on pintle pins 307 fixed in brackets 308 mounted on the beam 91. Adjustable nuts are provided for varying the effective lengths of the tensioning rods 304.

Brackets 309 and 310 (Fig. 8) intermediate the brackets 308 are mounted on beam 91 to provide bearings for a horizontal rock shaft 311. The central stiffening rib X¹ of the shell to which the handle 303 is secured has a hinge sleeve 313 at its upper end which is keyed to the shaft 311, so that when the shell is swung upwardly the shaft 311 is rocked. A plate cam 314 is fixed to the rock shaft 311, with its left-hand or cam face (Fig. 8) opposed to a button 315 projecting from the lower end of an arm 316 fixed to the forward end of a shaft 317 which turns in a bearing carried by a bracket 309. To the rear end (Fig. 7) of the shaft 317 an arm 318 is attached, the lower end of this arm carrying an adjustable pin 319 (Fig. 8) operative by engagement with the upper arm 320 of a lever pivoted at 321 to rock the lower arm 322 of this lever. This lever arm 322 is so located that when it is rocked to the right (Fig. 8) it trips the latch which normally holds the shipper rod in the operative position, thus stopping the machine or preventing it from being started. The above parts are so arranged that when the guard is in operative position the cam 314 is out of contact with the button 315 so that the shipper rod may be latched in the operative position, but when the guard is raised the cam 314 turns and contacts the button 315 and thus rocks the lever 322 to prevent the shipper rod from being latched in or remaining in operative position.

While one desirable embodiment of the invention has been shown and described by way of example, it is to be understood that all such modifications as fall within the terms of the appended claims are to be regarded as within the scope of the invention.

We claim:

1. In combination in a machine for side-filing the teeth of a saw cylinder comprising a series of equally spaced saw blades fixed to a rotatable shaft, means for simultaneously filing the opposite faces of two adjacent blades, means for turning the saw cylinder uninterruptedly through 360° while maintaining the filing means in operative contact with said blades, means for moving the filing means into contact with the saw blades and for automatically separating the filing means from the saw blades after the cylinder has completed a full revolution, means for shifting the filing means axially of the saw cylinder while the filing means is out of contact with the saw blades thereby to position the filing means for operative engagement with a fresh pair of blade surfaces, the filing means comprising a double-faced disk file whose axis is parallel to that of the saw cylinder, means for rotating the disk file while it is maintained in contact with the saw blades while the saw cylinder is rotated.

2. In combination, in a machine for side-filing the teeth of a saw cylinder comprising a series of equally spaced saw blades fixed to a rotatable shaft, means for simultaneously filing the opposite faces of two adjacent blades, means for turning the saw cylinder uinterruptedly through 360° while maintaining the filing means in operative contact with said blades, means for moving the filing means into contact with the saw blades and for automatically separating the filing means from the saw blades after the cylinder has completed a revolution, the filing means comprises a plurality of coaxial disk-type files, the number of files being an aliquot part of the number of blades in the saw cylinder, the files being equally spaced apart a distance which is a multiple of the distance between adjacent blades.

3. A machine according to claim 2 having means for shifting the files exially of the saw cylinder, while they are out of contact with the saw blades, a distance substantially equal to the distance between adjacent saw blades.

4. Apparatus for side filing the teeth of a saw cylinder comprising a series of circular blades mounted in equally spaced relation on a shaft, means for rotatably supporting said shaft, means operative to turn the shaft continuously, a file-carrying shaft parallel to the saw cylinder shaft, means supporting the file shaft for movement toward and from the saw cylinder and also axially of the saw cylinder, a plurality of disk-type files mounted on the file shaft, means for rotating the file shaft, means for moving the file shaft axially of the saw cylinder while the files are out of contact with the blades thereby to register the several files with spaces between adjacent blades of the saw cylinder, means for moving the file shaft toward the saw cylinder thereby to enter the files into said spaces so as to contact each file with the faces of adjacent blades, and means for withdrawing the files from between said blades at the completion of each revolution of the saw cylinder.

5. Apparatus for side filing the teeth of a saw cylinder comprising a series of blades mounted in spaced relation on a shaft, bearings for the shaft, a rotary file shaft parallel to the saw cylinder shaft, a disk-type file on the file shaft, bearings for the file shaft, a carriage supporting the bearings for the file shaft, means so guiding the carriage that the file shaft may be shifted bodily while keeping its axis in a horizontal plane, means for turning the file shaft regardless of the position of the carriage, means for turning the saw cylinder continuously and means for so moving the carriage as to enter the file between adjacent blades of the saw cylinder.

6. Apparatus according to claim 5, wherein the bearings for the file shaft are mounted on a slide which is movable, relatively to the carriage, axially of the saw cylinder, and means for moving said slide while the file is out of contact with a saw blade.

7. Apparatus for side filing the teeth of a saw cylinder comprising a series of blades mounted in spaced relation on a shaft, bearings for the shaft, a carriage movable in a plane which is parallel to a tangent to the peripheral surface of the saw cylinder, guides for the carriage, a slide mounted on the carriage for movement in a path which is parallel to the axis of the saw cylinder, bearings carried by the slide, a file shaft mounted in said bearings, the axis of the file shaft being parallel to that of the saw cylinder, a plurality of disk-type files mounted in spaced relation on the file shaft, means for turning the file shaft at all positions of the slide and carriage, means for moving the carriage back and forth along its guides, and means for moving the slide relatively to the carriage.

8. Apparatus according to claim 7, having means for turning the saw cylinder continuously, the means for moving the carirage and slide being so constructed and arranged that the slide is only movable after all of the teeth on a given saw blade have been filed on one side.

9. Apparatus according to claim 7 having means for turning the saw cylinder continuously, the means for moving the carriage and slide comprising clutches and clutch controlling cams, said means being so constructed and arranged that the slide can only be moved while the carriage is at a predetermined limit of its motion.

10. Apparatus for side filing the teeth of the blades of a saw cylinder, comprising means for rotatably supporting the saw cylinder to turn about a horizontal axis, means for uninterruptedly rotating the saw cylinder through an angle of at least 360°, and firing means operative to file the opposed face of adjacent blades while the cylinder is rotating, the means for filing the opposed faces of the blades comprising a disk-type file and means for rotating it about an axis parallel to that of the saw cylinder, the disk-type file having beveled surfaces at its opposite sides, said surfaces being inclined to the vertical at the desired angle of slope of the file surfaces of the blades, said beveled surfaces having file teeth.

11. Apparatus for side-filing the teeth of the blades of a saw cylinder, comprising means for rotatably supporting the saw cylinder, means for uninterruptedly rotating the saw cylinder through an angle of at least 360°, a double-faced disk-type file which, in operative position, is disposed between two adjacent blades and which is so shaped as simultaneously to contact the opposed faces of said blades, means supporting the file for movement bodily into and out of the space between adjacent blades, the supporting means being so constructed and arranged that the file may be moved axially of the saw cylinder to register it with the file spaces between adjacent blades, means to rotate the disk-type file while the latter occupies the space between adjacent blades and while the saw cylinder is rotating, means to retract the file from between the blades at the end of each complete rotation of the saw cylinder, means operative to shift the file to register it with a different inter-blade space, means to advance the file into the last-named space, and means to stop the machine when all of the saw blades have been filed.

12. That method of side-filing the blades of a saw cylinder which comprises as steps disposing a double-faced disk-type file within the space between adjacent blades of the saw cylinder, keeping the axis of the file parallel to that of the saw cylinder, causing the opposite faces respectively of the file to contact the opposed faces of said adjacent blades while rotating the file, turning the cylinder uninterruptedly through an angle of at least 360°, withdrawing the file from between the blades at the completion of each successive rotation of the saw cylinder, shifting the file relatively to the cylinder while it is withdrawn from the cylinder to register the file with another space between adjacent blades, entering the file into said latter space and contacting it with the opposed faces of the last-named blades, again turning the cylinder uninterruptedly through an angle of 360°, and repeating the operation as many times as necessary to sharpen all of the blades of the cylinder.

13. The method of filing saw blades according to claim 12, wherein a plurality of like coaxial files are employed, the number of files being an aliquot part of the number of blades in the cylinder, said method comprising the further step of so arranging the files that they are spaced apart a distance which is a multiple of the distance between adjacent blades.

References Cited in the file of this patent

UNITED STATES PATENTS

| | | |
|---|---|---|
| 207,919 | Walsh | Sept. 10, 1878 |
| 321,376 | Lyon | June 30, 1885 |
| 510,926 | McCurry | Dec. 19, 1893 |
| 540,145 | Chandler | May 28, 1895 |
| 600,458 | Taylor | Mar. 8, 1898 |
| 673,283 | Nance | Apr. 30, 1901 |
| 1,197,682 | Sweet | Sept. 12, 1916 |
| 1,813,503 | Merryweather | July 7, 1931 |
| 2,085,350 | Wood et al. | June 29, 1937 |
| 2,709,378 | Risor | May 31, 1955 |